United States Patent
An et al.

(10) Patent No.: US 11,697,726 B2
(45) Date of Patent: Jul. 11, 2023

(54) CELLULOSE ESTER COMPOSITIONS

(71) Applicant: Eastman Chemical Company, Kingsport, TN (US)

(72) Inventors: Haining An, Kingsport, TN (US); David Wayne Compton, Weber City, VA (US); Michael Eugene Donelson, Kingsport, TN (US); Wesley Wayne McConnell, Kingsport, TN (US); Jeffrey Todd Owens, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 1087 days.

(21) Appl. No.: 16/346,888

(22) PCT Filed: Nov. 9, 2017

(86) PCT No.: PCT/US2017/060790
§ 371 (c)(1),
(2) Date: May 2, 2019

(87) PCT Pub. No.: WO2018/089591
PCT Pub. Date: May 17, 2018

(65) Prior Publication Data
US 2020/0056011 A1    Feb. 20, 2020

Related U.S. Application Data

(60) Provisional application No. 62/420,976, filed on Nov. 11, 2016.

(51) Int. Cl.
*C08L 1/14* (2006.01)
*C08J 9/00* (2006.01)
*C08J 9/14* (2006.01)

(52) U.S. Cl.
CPC .............. *C08L 1/14* (2013.01); *C08J 9/0061* (2013.01); *C08J 9/141* (2013.01); *C08J 2203/14* (2013.01); *C08J 2301/14* (2013.01); *C08J 2401/14* (2013.01); *C08L 2201/02* (2013.01); *C08L 2203/14* (2013.01); *C08L 2205/025* (2013.01)

(58) Field of Classification Search
CPC .... C08L 1/14; C08L 2201/02; C08L 2203/14; C08L 2205/025; C08L 1/10; C08J 9/0061; C08J 9/141; C08J 2203/14; C08J 2301/14; C08J 2401/14; C08J 9/16; C08J 9/228; C08K 5/0016; C08K 5/0066
See application file for complete search history.

(56) References Cited

U.S. PATENT DOCUMENTS 6,083,601 A * 7/2000 Prince .................. B27N 3/28
428/71
2013/0040125 A1   2/2013 Eberstaller et al.

FOREIGN PATENT DOCUMENTS

JP     2007-284571     11/2007

OTHER PUBLICATIONS

ASTM D1238; "Standard Test Method for Melt Flow Rates of Thermoplastics by Extrusion Plastometer"; Aug. 1, 2013.
ASTM D3763; "Standard Test Method for High Speed Puncture Properties of Plastics Using Load and Displacement Sensors"; Nov. 1, 2018.
Notification of Transmittal of The International Search Report and The Written Opinion of the International Searching Authority, or the Declaration; International Application No. PCT/US2017/060790 with a filing date of Nov. 9, 2017.

* cited by examiner

*Primary Examiner* — Andrew J. Oyer
(74) *Attorney, Agent, or Firm* — Judith C. Rawls

(57) ABSTRACT

The application discloses cellulose ester compositions comprising two or more miscible blends of cellulose ester each comprising a plurality of propionyl substituents having tunable rheology and physical properties not achievable by any one of the cellulose esters alone. These cellulose ester compositions can be further processed, with or without other materials such as plasticizers, flame retardants, and blowing agents, and converted into articles. These cellulose ester compositions have higher modulus and have low to no butyryl/butyric acid content relative to cellulose acetate butyrate ("CAB") cellulose ester compositions made from CABs having a butyryl content of greater than 30 wt %.

16 Claims, No Drawings

CELLULOSE ESTER COMPOSITIONS

CROSS-REFERENCE TO RELATED APPLICATION(S)

This application is a national stage filing under 35 USC § 371 of International Application Number PCT/US2017/060790, filed on Nov. 9, 2017, which claims the benefit of the filing date to U.S. Provisional Application No. 62/420,976 filed on Nov. 11, 2016, the entire disclosures of which are incorporated by reference herein.

BACKGROUND

It has been discovered that two or more cellulose esters each comprising a plurality of propionyl substituents can be blended without the aid of a solvent to prepare cellulose ester compositions having tunable rheology and physical properties not achievable by any one of the cellulose esters alone. These cellulose ester compositions can further be processed, with or without materials such as plasticizers, flame retardants and blowing agents, to tune their properties, and converted into articles. These cellulose ester compositions have a high modulus and have low to no butyryl/butyric acid content relative to cellulose acetate butyrate cellulose ester ("CAB") compositions made from CABs having a butyryl content of greater than 30 wt %.

SUMMARY

The present application discloses a cellulose ester composition comprising:
(a) a first cellulose ester comprising:
(i) a plurality of propionyl substituents,
(ii) a plurality of acetyl substituents,
(iii) a plurality of hydroxyl substituents,
  wherein the degree of substitution of the propionyl substituent of the first cellulose ester ("$DS_{Pr1}$") is in the range of from about 1.1 to about 2.87,
  wherein the degree of substitution of the acetyl substituent of the first cellulose ester ("$DS_{Ac1}$") is in the range of from about 0 to about 0.3,
  wherein the degree of substitution of the hydroxyl substituent of the first cellulose ester ("$DS_{OH1}$") is in the range of from about 0.05 to about 0.7,
  wherein the weight average molecular weight of the first cellulose ester ("$M_{w1}$") is in the range of from about 60,000 Da to about 200,000 Da; and
(b) a second cellulose ester comprising:
(i) a plurality of propionyl substituents,
(ii) a plurality of acetyl substituents, and
(iii) a plurality of hydroxyl substituents,
  wherein the degree of substitution of the propionyl substituent the second cellulose ester ("$DS_{Pr2}$") is in the range of from about 1.1 to about 2.87,
  wherein the degree of substitution of the acetyl substituent of the cellulose ester ("$DS_{Ac2}$") is in the range of from about 0 to about 0.3,
  wherein the degree of substitution of the hydroxyl substituent of the cellulose ester ("$DS_{OH2}$") is in the range of from about 0.05 to about 0.7,
    wherein the weight average molecular weight of the second cellulose ester ("$M_{w2}$") is in the range of from about 15,000 Da to about 60,000 Da;
  wherein the weight average molecular weight of the cellulose ester composition ("$M_w$") is greater than $M_{w2}$ but less than $M_{w1}$, wherein $M_w$, $M_{w1}$, and $M_{w2}$ are determined by GPC using THF as a solvent,
wherein the first cellulose ester and the second cellulose ester are miscible,
wherein the cellulose ester composition has a single glass transition temperature ("$T_g$").

DETAILED DESCRIPTION

Definitions

In this specification and in the claims that follow, reference will be made to a number of terms, which shall be defined to have the following meanings.

"Binary" as used with respect to the cellulose ester components means that only two cellulose esters are used in the cellulose ester composition, but other non-cellulosic components can be included in the cellulose ester composition. The two cellulose esters can be at any ratio. For example, the ratio of the first cellulose ester to second cellulose ester can be from about 1 wt % to about 99 wt % of the cellulose ester and about 1 wt % to about 99 wt % of the second cellulose ester.

"Miscible" as used through relating to two or more polymers means that the two or more polymers form a homogeneous mixture. Miscible polymer blends typically are optically clear resins having a single composition-dependent glass transition temperature. Miscible blends can be viewed as a subset of compatible blends which results when two materials are combined to give a resin with beneficial properties.

"Infused" means to inject, attach, introduce, or otherwise include a material or blowing agent into the cellulose ester composition.

"Blowing agent" means all blowing agents known to one of ordinary skill in the art. Non-limiting examples include alkanes or haloalkanes such as propane, n-butane, isobutene, n-pentane, isopentane, neopentane, cyclopentane, and or hexane and its isomers, alcohols, ketones, esters, ethers, 1,1,1,3,3-pentafluloropentane, 1,1,1,4,4,4-hexafluoro-2-butene, or mixtures thereof.

"Alkane" means an aliphatic hydrocarbon. The alkane can specify the number of carbon atoms, for example ($C_{1-5}$) alkane. The alkane can also have halogen groups replace one or more of the hydrogen atoms to form a haloalkane and/or one or more of the carbon-carbon bonds may be unsaturated to form double and triple bonds. Non-limiting examples of alkanes include methane, ethane, propane, propene, propyne, 1-fluoroethane, 1,1-dibromoepropane, and the like.

Values may be expressed as "about" or "approximately" a given number. Similarly, ranges may be expressed herein as from "about" one particular value and/or to "about" or another particular value. When such a range is expressed, another aspect includes from the one particular value and/or to the other particular value. Similarly, when values are expressed as approximations, by use of the antecedent "about," it will be understood that the particular value forms another aspect.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone;

A and B in combination; A and C in combination, B and C in combination; or A, B, and C in combination.

As used herein, the term "chosen from" is used with a list of two or more items, and has a specific meaning when used in conjunction with either "and" or "or." For example, if a composition is described as chosen from A, B and C, the composition can contain A alone, B alone or C alone. If a composition is described as chosen from A, B, or C, the composition can contain A alone, B, alone, C alone, the combination of A and B, the combination of A and C, or the combination of A, B and C.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "includes," and "include" have the same open-ended meaning as "comprising," "comprises," and "comprise" provided above.

"Flame retardants" can be classified as reactive or additive. Flame retardants can also be classified into several classes: minerals, organohalogen compounds, or organophosphorous compounds. Nonlimiting examples of minerals include aluminum hydroxide, magnesium hydroxide, huntite, hydromagnesite, red phosphorous, boron compounds, such as borates. Nonlimiting examples of organohalogen compounds include organochlorine compounds, such as chlorendic acid derivatives and chlorinated paraffins; organobromine compounds such as decabromodiphenyl ether, decabromodiphenyl ethane, polymeric brominated compounds such as brominated polystryenes, brominated carbonate oligomers, brominated epoxy oligomers, tetrabromophphthalic anhydride, tetrabromobisphenol A, and hexabromocyclododecane. Nonlimiting examples of organophosphorous compounds include organophosphates such as resorcinol bis(diphenylphosphate), bisphenol A diphenyl phosphate, and tricresyl phosphate; phosphonates such as dimethyl methyl phosphonate; phosphinates such as aluminum diethyl phosphinate; brominated organo phoshates such as tris(2,3dibromopropyl) phosphate, chlorinated organophosphates such as tris(1,3-dichloro-2-propyl) phosphate, and tetrakis(2-chloroethyl)dichloroisopentyldiphosphate.

"Degree of Substitution" is used to describe the substitution level of the substituents of the substituents per anhydroglucose unit ("AGU"). Generally, conventional cellulose contain three hydroxyl groups in each AGU that can be substituted. Therefore, the DS can have a value between 0 and 3. However, low molecular weight cellulose mixed esters can have a total degree of substitution slightly above 3 from end group contributions. Low molecular weight cellulose mixed esters are discussed in more detail subsequently in this disclosure. Because DS is a statistical mean value, a value of 1 does not assure that every AGU has a single substitutent. In some cases, there can be unsubstituted anhydroglucose units, some with two and some with three substitutents, and more often than not the value will be a noninteger. Total DS is defined as the average number of all of substituents per anhydroglucose unit. The degree of substitution per AGU can also refer to a particular substitutent, such as, for example, hydroxyl, acetyl, butyryl, or propionyl. Additionally, the degree of substitution can specify which carbon unit of the anhydroglucose unit.

Cellulose Ester Compositions

The present application discloses a cellulose ester composition comprising: (a) a first cellulose ester comprising: (i) a plurality of propionyl substituents, (ii) a plurality of acetyl substituents, (iii) a plurality of hydroxyl substituents, wherein the degree of substitution of the propionyl substituent of the first cellulose ester ("$DS_{Pr1}$") is in the range of from about 1.1 to about 2.87, wherein the degree of substitution of the acetyl substituent of the first cellulose ester ("$DS_{Ac1}$") is in the range of from about 0 to about 0.3, wherein the degree of substitution of the hydroxyl substituent of the first cellulose ester ("$DS_{OH1}$") is in the range of from about 0.05 to about 0.7, wherein the weight average molecular weight of the first cellulose ester ("$M_{w1}$") is in the range of from about 60,000 Da to about 200,000 Da; and (b) a second cellulose ester comprising: (i) a plurality of propionyl substituents, (ii) a plurality of acetyl substituents, and (iii) a plurality of hydroxyl substituents, wherein the degree of substitution of the propionyl substituent the second cellulose ester ("$DS_{Pr2}$") is in the range of from about 1.1 to about 2.87, wherein the degree of substitution of the acetyl substituent of the cellulose ester ("$DS_{Ac2}$") is in the range of from about 0 to about 0.3, wherein the degree of substitution of the hydroxyl substituent of the cellulose ester ("$DS_{OH2}$") is in the range of from about 0.05 to about 0.7, wherein the weight average molecular weight of the second cellulose ester ("$M_{w2}$") is in the range of from about 15,000 Da to about 60,000 Da; wherein the weight average molecular weight of the cellulose ester composition ("$M_w$") is greater than $M_{w2}$ but less than $M_{w1}$, wherein $M_w$, $M_{w1}$, and $M_{w2}$ are determined by gel permeation chromatography ("GPC") using tetrahydrofuran as a solvent, wherein the first cellulose ester and the second cellulose ester are miscible, wherein the cellulose ester composition has a single glass transition temperature ("$T_g$").

In one embodiment of this cellulose ester composition, the weight average molecular weight of the first cellulose ester ("$M_{w1}$") is in the range of from about 100,000 Da to about 200,000 Da. In one embodiment of this cellulose ester composition, the weight average molecular weight of the first cellulose ester ("$M_{w1}$") is in the range of from about 100,000 Da to about 150,000 Da. In one embodiment of this cellulose ester composition, the weight average molecular weight of the first cellulose ester ("$M_{w1}$") is in the range of from about 60,000 Da to about 150,000 Da. In one embodiment of this cellulose ester composition, the weight average molecular weight of the first cellulose ester ("$M_{w1}$") is in the range of from about 60,000 Da to about 100,000 Da.

In one embodiment of this cellulose ester composition, the second cellulose ester of this cellulose ester composition, the second cellulose ester is present in the range of from about 4 wt % to about 60 wt % based on the total weight of the composition. In one embodiment of this cellulose ester composition, the second cellulose ester is at 0 wt %.

In one embodiment of this cellulose ester composition, the $DS_{Pr1}$ is in the range of from about 2.1 to about 2.87, the $DS_{Ac1}$ is in the range of from about 0.08 to about 0.3, the $DS_{Pr2}$ is in the range of from about 2.1 to about 2.87, and the $DS_{Ac2}$ is in the range of from about 0.08 to about 0.3. In one class of this embodiment, the cellulose ester composition is binary with respect to the cellulose ester components. In one class of this embodiment, the cellulose ester composition is prepared without a solvent.

In one embodiment of this cellulose ester composition, the cellulose ester composition is not compostable.

In one embodiment of this cellulose ester composition, the cellulose ester composition is binary with respect to the cellulose ester components. In one class of this embodiment, the cellulose ester composition is prepared without a solvent.

In one embodiment of this cellulose ester composition, the cellulose ester composition is prepared without a solvent. In one class of this embodiment, the cellulose ester composition is prepared by extrusion.

In one embodiment of this cellulose ester composition, the cellulose ester composition is prepared by extrusion.

In one embodiment of this cellulose ester composition, the cellulose ester composition is prepared by a melt process.

In one embodiment of this cellulose ester composition, the cellulose ester composition further comprises about 3 wt % to about 30 wt %, based on the weight of the cellulose ester composition, of an additive chosen from a plasticizer or a flame retardant. In one class of this embodiment, the plasticizer is chosen from an aromatic phosphate ester plasticizer, alkyl phosphate ester plasticizer, dialkylether diester plasticizer, tricarboxylic ester plasticizer, polymeric polyester plasticizer, polyglycol diester plasticizer, polyester resin plasticizer, aromatic diester plasticizer, aromatic triester plasticizer, aliphatic diester plasticizer, carbonate plasticizer, epoxidized ester plasticizer, epoxidized oil plasticizer, benzoate plasticizer, polyol benzoate plasticizer, adipate plasticizer, a phthalate plasticizer, a glycolic acid ester plasticizer, a citric acid ester plasticizer, a hydroxyl-functional plasticizer, or a solid, non-crystalline resin plasticizer. In one class of this embodiment, the plasticizer is chosen from triethylene glycol 2-ethyl hexanoate, epoxidized soybean oil, or acetyl triethyl citrate.

In one class of this embodiment, the flame retardant has greater than 5 wt % phosphorous content based on the total weight of the composition. In one class of this embodiment, the flame retardant is an organophosphorous compound. In one subclass of this class, the organophosphorous compound is chosen from resorcinol bisdiphenyl phosphate, bisphenol A diphenyl phosphate, resorcinol bis(di-2,6-xylyl phosphate), tricresyl phosphate, dimethyl methylphosphonate, aluminum diethyl phosphinate, tris(2,3-dibromopropyl) phosphate, tris(1,3-dichloro-2-propyl)phosphate, or tetrakis (2-chloroethyl)dichloroisopentyldiphosphate. In one subclass of this class, the organophosphorous compound is resorcinol bisdiphenyl phosphate.

In one class of this embodiment, the cellulose ester composition further comprises at least about 2 wt % to about 12 wt % of a blowing agent based on the total weight of the composition. In one subclass of this class, the blowing agent is one or more of an ($C_{1-5}$) alkane.

In one class of this embodiment, the cellulose ester composition has a melt flow rate ("MFR") that is greater than about 3 g/10 min as determined by ASTM D1238, method B using a temperature of 200° C. and a 5 kg weight. In one subclass of this class, the energy at maxload is greater than about 5 joules as determined by ASTM D3763 using a 10.2 cm×10.2 cm×0.32 cm plaque formed from the cellulose ester composition. In one sub-subclass of this subclass, when two 10 mil film strips having a width of 2.54 cm formed from the cellulose ester composition are heat laminated at 130° C. for 5 s, the average tensile peel strength force is in the range of from about 0.2 kg-force to about 10.0 kg-force. In one sub-sub-subclass of this sub-subclass, the cellulose ester composition comprises at least 5 wt % of triethylene glycol 2-ethyl hexanoate; and less than 15 wt % of a flame retardant, each based on the total weight of the composition. In one sub-subclass of this subclass, when two 10 mil film strips having a width of 2.54 cm formed from the cellulose ester composition are heat laminated at 130° C. for 5 s, the average tensile peel strength force is in the range of from about 0.2 kg-force to about 4.0 kg-force. In one sub-sub-subclass of this sub-subclass, the cellulose ester composition comprises at least 5 wt % of triethylene glycol 2-ethyl hexanoate; and less than 15 wt % of a flame retardant, each based on the total weight of the composition. In one subclass of this class, the energy at maxload is in the range of from about 5 joules to about 40 joules as determined by ASTM D3763 using a 10.2 cm×10.2 cm×0.32 cm plaque formed from the cellulose ester composition.

In one class of this embodiment, the cellulose ester composition has a melt flow rate ("MFR") that is greater than about 7 g/10 min as determined by ASTM D1238, method B using a temperature of 200° C. and a 5 kg weight. In one subclass of this class, the energy at maxload is greater than about 5 joules as determined by ASTM D3763 using a 10.2 cm×10.2 cm×0.32 cm plaque formed from the cellulose ester composition. In one sub-subclass of this subclass, when two 10 mil film strips having a width of 2.54 cm formed from the cellulose ester composition are heat laminated at 130° C. for 5 s, the average tensile peel strength force is in the range of from about 0.2 kg-force to about 10.0 kg-force. In one sub-sub-subclass of this sub-subclass, the cellulose ester composition comprises at least 5 wt % of triethylene glycol 2-ethyl hexanoate; and less than 15 wt % of a flame retardant, each based on the total weight of the composition. In one sub-subclass of this subclass, when two 10 mil film strips having a width of 2.54 cm formed from the cellulose ester composition are heat laminated at 130° C. for 5 s, the average tensile peel strength force is in the range of from about 0.2 kg-force to about 4.0 kg-force. In one sub-sub-subclass of this sub-subclass, the cellulose ester composition comprises at least 5 wt % of triethylene glycol 2-ethyl hexanoate; and less than 15 wt % of a flame retardant, each based on the total weight of the composition. In one subclass of this class, the energy at maxload is in the range of from about 5 joules to about 40 joules as determined by ASTM D3763 using a 10.2 cm×10.2 cm×0.32 cm plaque formed from the cellulose ester composition.

In one class of this embodiment, the cellulose ester composition has a melt flow rate ("MFR") that is in the range of from about 7 g/10 min to about 263 g/10 min as determined by ASTM D1238, method B using a temperature of 200° C. and a 5 kg weight. In one subclass of this class, the energy at maxload is greater than about 5 joules as determined by ASTM D3763 using a 10.2 cm×10.2 cm×0.32 cm plaque formed from the cellulose ester composition. In one sub-subclass of this subclass, when two 10 mil film strips having a width of 2.54 cm formed from the cellulose ester composition are heat laminated at 130° C. for 5 s, the average tensile peel strength force is in the range of from about 0.2 kg-force to about 10.0 kg-force. In one sub-sub-subclass of this sub-subclass, the cellulose ester composition comprises at least 5 wt % of the additive, triethylene glycol 2-ethyl hexanoate, each based on the total weight of the composition. In one sub-subclass of this subclass, when two 10 mil film strips having a width of 2.54 cm formed from the cellulose ester composition are heat laminated at 130° C. for 5 s, the average tensile peel strength force is in the range of from about 0.2 kg-force to about 4.0 kg-force. In one sub-sub-subclass of this sub-subclass, the cellulose ester composition comprises at least 5 wt % of the additive, triethylene glycol 2-ethyl hexanoate, each based on the total weight of the composition. In one subclass of this class, the energy at maxload is in the range of from about 5 joules to about 40 joules as determined by ASTM D3763 using a 10.2 cm×10.2 cm×0.32 cm plaque formed from the cellulose ester composition.

In one embodiment of this cellulose ester composition, the cellulose ester composition has a melt flow rate ("MFR") that is greater than about 3 g/10 min as determined by ASTM D1238, method B using a temperature of 200° C. and a 5 kg weight. In one embodiment of this cellulose ester composition, the cellulose ester composition has a melt flow rate ("MFR") that is greater than about 4 g/10 min as determined by ASTM D1238, method B using a temperature of 200° C. and a 5 kg weight. In one embodiment of this cellulose ester composition, the cellulose ester composition has a melt flow rate ("MFR") that is greater than about 5 g/10 min as determined by ASTM D1238, method B using a temperature of 200° C. and a 5 kg weight. In one embodiment of this cellulose ester composition, the cellulose ester composition has a melt flow rate ("MFR") that is greater than about 6 g/10 min as determined by ASTM D1238, method B using a temperature of 200° C. and a 5 kg weight. In one embodiment of this cellulose ester composition, the cellulose ester composition has a melt flow rate ("MFR") that is greater than about 7 g/10 min as determined by ASTM D1238, method B using a temperature of 200° C. and a 5 kg weight. In one embodiment of this cellulose ester composition, the cellulose ester composition has a melt flow rate ("MFR") that is greater than about 8 g/10 min as determined by ASTM D1238, method B using a temperature of 200° C. and a 5 kg weight. In one embodiment of this cellulose ester composition, the cellulose ester composition has a melt flow rate ("MFR") that is in the range of from about 3 g/10 min to about 263 g/10 min as determined by ASTM D1238, method B using a temperature of 200° C. and a 5 kg weight. In one embodiment of this cellulose ester composition, the cellulose ester composition has a melt flow rate ("MFR") that is in the range of from about 5 g/10 min to about 263 g/10 min as determined by ASTM D1238, method B using a temperature of 200° C. and a 5 kg weight. In one embodiment of this cellulose ester composition, the cellulose ester composition has a melt flow rate ("MFR") that is in the range of from about 7 g/10 min to about 263 g/10 min as determined by ASTM D1238, method B using a temperature of 200° C. and a 5 kg weight. In one embodiment of this cellulose ester composition, the cellulose ester composition has a melt flow rate ("MFR") that is in the range of from about 8 g/10 min to about 263 g/10 min as determined by ASTM D1238, method B using a temperature of 200° C. and a 5 kg weight. In one embodiment of this cellulose ester composition, the cellulose ester composition has a melt flow rate ("MFR") that is in the range of from about 10 g/10 min to about 263 g/10 min as determined by ASTM D1238, method B using a temperature of 200° C. and a 5 kg weight.

In one embodiment this cellulose ester composition, wherein energy at maxload is greater than about 5 joules as determined by ASTM D3763 using a 10.2 cm×10.2 cm×0.32 cm plaque formed from the cellulose ester composition. In one embodiment this cellulose ester composition, wherein energy at maxload is greater than about 6 joules as determined by ASTM D3763 using a 10.2 cm×10.2 cm×0.32 cm plaque formed from the cellulose ester composition. In one embodiment this cellulose ester composition, wherein energy at maxload is greater than about 7 joules as determined by ASTM D3763 using a 10.2 cm×10.2 cm×0.32 cm plaque formed from the cellulose ester composition. In one embodiment this cellulose ester composition, wherein energy at maxload is greater than about 10 joules as determined by ASTM D3763 using a 10.2 cm×10.2 cm×0.32 cm plaque formed from the cellulose ester composition. In one embodiment this cellulose ester composition, wherein energy at maxload is greater than about 15 joules as determined by ASTM D3763 using a 10.2 cm×10.2 cm×0.32 cm plaque formed from the cellulose ester composition. In one embodiment this cellulose ester composition, wherein energy at maxload is greater than about 20 joules as determined by ASTM D3763 using a 10.2 cm×10.2 cm×0.32 cm plaque formed from the cellulose ester composition.

In one embodiment of this cellulose ester composition, the cellulose ester composition can be infused with at least about 2 wt % to about 12 wt of a blowing agent based on the total weight of the composition. In one class of this embodiment, the blowing agent is one or more of an $(C_{1-5})$ alkane.

In one embodiment of this cellulose ester composition, the cellulose ester composition can be infused with at least about 3 wt % to about 12 wt of a blowing agent based on the total weight of the composition. In one class of this embodiment, the blowing agent is one or more of an $(C_{1-5})$ alkane.

In one embodiment of this cellulose ester composition, the cellulose ester composition can be infused with at least about 4 wt % to about 12 wt of a blowing agent based on the total weight of the composition. In one class of this embodiment, the blowing agent is one or more of an $(C_{1-5})$ alkane.

In one embodiment of this cellulose ester composition, the cellulose ester composition can be infused with at least about 5 wt % to about 12 wt of a blowing agent based on the total weight of the composition. In one class of this embodiment, the blowing agent is one or more of an $(C_{1-5})$ alkane.

In one embodiment of this cellulose ester composition, the cellulose ester composition can be made into an article.

In one embodiment of this cellulose ester composition, when two 10 mil film strips having a width of 2.54 cm formed from the cellulose ester composition are heat laminated at 130° C. for 5 s, the average tensile peel strength force is in the range of from about 0.2 kg-force to about 5.0 kg-force. The present application discloses a cellulose ester composition comprising a cellulose ester blend and a blowing agent; wherein the cellulose ester blend comprises: (a) an additive chosen from a plasticizer or a flame retardant; (b) a first cellulose ester comprising: (i) a plurality of propionyl substituents, (ii) a plurality of acetyl substituents, (iii) a plurality of hydroxyl substituents, wherein the degree of substitution of the propionyl substituent of the first cellulose ester ("$DS_{Pr1}$") is in the range of from about 1.1 to about 2.87, wherein the degree of substitution of the acetyl substituent of the first cellulose ester ("$DS_{Ac1}$") is in the range of from about 0 to about 0.3, wherein the degree of substitution of the hydroxyl substituent of the first cellulose ester ("$DS_{OH1}$") is in the range of from about 0.05 to about 0.7, wherein the weight average molecular weight of the first cellulose ester ("$M_{w1}$") is in the range of from about 60,000 Da to about 200,000 Da; and (c) a second cellulose ester comprising: (i) a plurality of propionyl substituents, (ii) a plurality of acetyl substituents, and (iii) a plurality of hydroxyl substituents, wherein the degree of substitution of the propionyl substituent the second cellulose ester ("$DS_{Pr2}$") is in the range of from about 1.1 to about 2.87, wherein the degree of substitution of the acetyl substituent of the cellulose ester ("$DS_{Ac2}$") is in the range of from about 0 to about 0.3, wherein the degree of substitution of the hydroxyl substituent of the cellulose ester ("$DS_{OH2}$") is in the range of from about 0.05 to about 0.7, wherein the weight average molecular weight of the second cellulose ester ("$M_{w2}$") is in the range of from about 15,000 Da to about 60,000 Da; wherein the weight average molecular weight of the cellulose ester composition ("$M_w$") is greater than $M_{w2}$ but less than $M_{w1}$, wherein $M_w$, $M_{w1}$, and $M_{w2}$ are determined by GPC using tetrahydrofuran ("THF") as a solvent, wherein the first cellulose ester is present in the range of from about 40 wt % to about 95 wt % based on the total weight of the cellulose ester blend, wherein the second cellulose ester is present in the range of from about 0 wt % to about 55 wt % based on the total weight of the composition, wherein the additive is present in the range of from about 1 wt % to about 30 wt % based on the total weight of the cellulose ester blend wherein when the second cellulose ester is present, the first cellulose ester and the second cellulose ester are miscible, and wherein the blowing agent is present in the range of from about 2 wt % to about 12 wt % based on the total weight of the cellulose ester composition.

In one embodiment of this cellulose ester composition, the $DS_{Pr1}$ is in the range of from about 2.1 to about 2.87, the $DS_{Ac1}$ is in the range of from about 0.08 to about 0.3, the $DS_{Pr2}$ is in the range of from about 2.1 to about 2.87, and the $DS_{Ac2}$ is in the range of from about 0.08 to about 0.3.

In one embodiment of this cellulose ester composition, the cellulose ester blend is not compostable.

In one embodiment of this cellulose ester composition, the cellulose ester blend has a single glass transition temperature ("$T_g$").

In one embodiment of this cellulose ester composition, $M_{w1}$ is in the range of from about 60,000 Da to about 100,000 Da, and the second cellulose ester is present in the range o from about 0 wt % to about 10 wt %, based on the total weight of the composition.

In one embodiment of this cellulose ester composition, the blowing agent is one or more of an ($C_{1-5}$) alkane.

In one embodiment of this cellulose ester composition, the blowing agent is infused into the cellulose ester blend.

In one embodiment of this cellulose ester composition, the cellulose ester composition is prepared without a solvent. In one class of this embodiment, the cellulose ester composition is prepared by extrusion.

In one embodiment of this cellulose ester composition, the cellulose ester blend is prepared by extrusion.

In one embodiment of this cellulose ester composition, the cellulose ester blend is prepared by a melt process. In one class of this embodiment, the plasticizer is chosen from an aromatic phosphate ester plasticizer, alkyl phosphate ester plasticizer, dialkylether diester plasticizer, tricarboxylic ester plasticizer, polymeric polyester plasticizer, polyglycol diester plasticizer, polyester resin plasticizer, aromatic diester plasticizer, aromatic triester plasticizer, aliphatic diester plasticizer, carbonate plasticizer, epoxidized ester plasticizer, epoxidized oil plasticizer, benzoate plasticizer, polyol benzoate plasticizer adipate plasticizer, a phthalate plasticizer, a glycolic acid ester plasticizer, a citric acid ester plasticizer, a hydroxyl-functional plasticizer, or a solid, non-crystalline resin plasticizer. In one class of this embodiment, the plasticizer is chosen from triethylene glycol 2-ethyl hexanoate, epoxidized soybean oil, or acetyl triethyl citrate.

In one class of this embodiment, the flame retardant has greater than 5 wt % phosphorous content, based on the total weight of the composition. In one class of this embodiment, the flame retardant is an organophosphorous compound. In one subclass of this class, the organophosphorous compound is chosen from resorcinol bisdiphenyl phosphate, bisphenol A diphenyl phosphate, resorcinol bis(di-2,6-xylyl phosphate), tricresyl phosphate, dimethyl methylphosphonate, aluminum diethyl phosphinate, tris(2,3-dibromopropyl) phosphate, tris(1,3-dichloro-2-propyl)phosphate, or tetrakis (2-chloroethyl)dichloroisopentyldiphosphate. In one subclass of this class, the organophosphorous compound is resorcinol bisdiphenyl phosphate.

In one embodiment of this cellulose ester composition, the cellulose ester blend has a melt flow rate ("MFR") that is greater than about 3 g/10 min as determined by ASTM D1238, method B using a temperature of 200° C. and a 5 kg weight. In one embodiment of this cellulose ester composition, the cellulose ester blend by ASTM D1238, method B using a temperature of 200° C. and a 5 kg weight. In one embodiment of this cellulose ester composition, the cellulose ester blend has a melt flow rate ("MFR") that is greater than about 5 g/10 min as determined by ASTM D1238, method B using a temperature of 200° C. and a 5 kg weight. In one embodiment of this cellulose ester composition, the cellulose ester blend has a melt flow rate ("MFR") that is greater than about 6 g/10 min as determined by ASTM D1238, method B using a temperature of 200° C. and a 5 kg weight. In one embodiment of this cellulose ester composition, the cellulose ester blend has a melt flow rate ("MFR") that is greater than about 7 g/10 min as determined by ASTM D1238, method B using a temperature of 200° C. and a 5 kg weight. In one embodiment of this cellulose ester blend, the cellulose ester composition has a melt flow rate ("MFR") that is greater than about 8 g/10 min as determined by ASTM D1238, method B using a temperature of 200° C. and a 5 kg weight. In one embodiment of this cellulose ester composition, the cellulose ester blend has a melt flow rate ("MFR") that is in the range of from about 3 g/10 min to about 263 g/10 min as determined by ASTM D1238, method B using a temperature of 200° C. and a 5 kg weight. In one embodiment of this cellulose ester composition, the cellulose ester blend has a melt flow rate ("MFR") that is in the range of from about 5 g/10 min to about 263 g/10 min as determined by ASTM D1238, method B using a temperature of 200° C. and a 5 kg weight. In one embodiment of this cellulose ester composition, the cellulose ester blend has a melt flow rate ("MFR") that is in the range of from about 7 g/10 min to about 263 g/10 min as determined by ASTM D1238, method B using a temperature of 200° C. and a 5 kg weight. In one embodiment of this cellulose ester composition, the cellulose ester blend has a melt flow rate ("MFR") that is in the range of from about 8 g/10 min to about 263 g/10 min as determined by ASTM D1238, method B using a temperature of 200° C. and a 5 kg weight. In one embodiment of this cellulose ester composition, the cellulose ester blend has a melt flow rate ("MFR") that is in the range of from about 10 g/10 min to about 263 g/10 min as determined by ASTM D1238, method B using a temperature of 200° C. and a 5 kg weight.

In one embodiment this cellulose ester composition, wherein energy at maxload is greater than about 5 joules as determined by ASTM D3763 using a 10.2 cm×10.2 cm×0.32 cm plaque formed from the cellulose ester blend. In one embodiment this cellulose ester composition, wherein energy at maxload is greater than about 6 joules as determined by ASTM D3763 using a 10.2 cm×10.2 cm×0.32 cm plaque formed from the cellulose ester blend. In one embodiment this cellulose ester composition, wherein energy at maxload is greater than about 7 joules as determined by ASTM D3763 using a 10.2 cm×10.2 cm×0.32 cm plaque formed from the cellulose ester blend. In one embodiment this cellulose ester composition, wherein energy at maxload is greater than about 10 joules as determined by ASTM D3763 using a 10.2 cm×10.2 cm×0.32 cm plaque formed from the cellulose ester blend. In one embodiment this cellulose ester composition, wherein energy at maxload is greater than about 15 joules as determined by ASTM D3763 using a 10.2 cm×10.2 cm×0.32 cm plaque formed from the cellulose ester blend. In one embodiment this cellulose ester composition, wherein energy at maxload is greater than about 20 joules as determined by ASTM D3763 using a 10.2 cm×10.2 cm×0.32 cm plaque formed from the cellulose ester blend.

In one embodiment of this cellulose ester composition, the blowing agent is infused into the cellulose ester blend. In one class of this embodiment, the blowing agent is one or more of an ($C_{1-5}$) alkane.

In one embodiment of this cellulose ester composition, the blowing agent is infused into the cellulose ester blend. In one class of this embodiment, the blowing agent is one or more of an ($C_{1-5}$) alkane.

In one embodiment of this cellulose ester composition, the blowing agent is infused into the cellulose ester blend. In one class of this embodiment, the blowing agent is one or more of an ($C_{1-5}$) alkane.

In one embodiment of this cellulose ester composition, the blowing agent is infused into the cellulose ester blend. In one class of this embodiment, the blowing agent is one or more of an ($C_{1-5}$) alkane.

In one embodiment of this cellulose ester composition, the cellulose ester composition can be made into an article.

In one embodiment of this cellulose ester composition, when two 0.254 mm film strips having a width of 2.54 cm formed from the cellulose ester blend are heat laminated at 130° C. for 5 s, the average tensile peel strength force is in the range of from about 0.2 kg-force to about 10.0 kg-force. In one embodiment of this cellulose ester composition, when two 0.254 mm film strips having a width of 2.54 cm formed from the cellulose ester blend are heat laminated at 130° C. for 5 s, the average tensile peel strength force is in the range of from about 0.2 kg-force to about 5.0 kg-force. In one embodiment of this cellulose ester composition, when two 0.254 mm film strips having a width of 2.54 cm formed from the cellulose ester blend are heat laminated at 130° C. for 5 s, the average tensile peel strength force is in the range of from about 0.2 kg-force to about 4.0 kg-force.

The present application also discloses a composition which comprises: (a) a cellulose ester comprising: (i) a plurality of propionyl substituents, (ii) a plurality of acetyl substituents, (iii) a plurality of hydroxyl substituents, wherein the degree of substitution of the propionyl substituent of the first cellulose ester ("$DS_{Pr1}$") is in the range of from about 1.1 to about 2.87, wherein the degree of substitution of the acetyl substituent of the first cellulose ester ("$DS_{Ac1}$") is in the range of from about 0 to about 0.3, wherein the degree of substitution of the hydroxyl substituent of the first cellulose ester ("$DS_{OH1}$") is in the range of from about 0.05 to about 0.7, wherein the weight average molecular weight of the first cellulose ester ("$M_{w1}$") is in the range of from about 60,000 Da to about 200,000 Da; (b) a flame retardant; and (c) a plasticizer, wherein when two 0.254 mm film strips having a width of 2.54 cm formed from the cellulose ester composition are heat laminated at 130° C. for 5 s, the average tensile peel strength force is in the range of from about 0.2 kg-force to about 10.0 kg-force.

In one embodiment, the flame retardant is present from about 3 wt % to about 20 wt % based on the total weight of the composition. In one class of this embodiment, the flame retardant is an organophosphate compound. In one class of this embodiment, the plasticizer is present from about 1 wt % to about 10 wt % based on the total weight of the composition. In one subclass of this class, the plasticizer is chosen from an aromatic phosphate ester plasticizer, alkyl phosphate ester plasticizer, dialkylether diester plasticizer, tricarboxylic ester plasticizer, polymeric polyester plasticizer, polyglycol diester plasticizer, polyester resin plasticizer, aromatic diester plasticizer, aromatic triester plasticizer, aliphatic diester plasticizer, carbonate plasticizer, epoxidized ester plasticizer, epoxidized oil plasticizer, benzoate plasticizer, polyol benzoate plasticizer adipate plasticizer, a phthalate plasticizer, a glycolic acid ester plasticizer, a citric acid ester plasticizer, a hydroxyl-functional plasticizer, or a solid, non-crystalline resin plasticizer. In one subclass of this class, the plasticizer is triethylene glycol 2-ethyl hexanoate.

In one embodiment, the flame retardant is present from about 3 wt % to about 15 wt % based on the total weight of the composition. In one class of this embodiment, the flame retardant is an organophosphate compound. In one class of this embodiment, the plasticizer is present from about 1 wt % to about 15 wt % based on the total weight of the composition. In one subclass of this class, the plasticizer is chosen from an aromatic phosphate ester plasticizer, alkyl phosphate ester plasticizer, dialkylether diester plasticizer, tricarboxylic ester plasticizer, polymeric polyester plasticizer, polyglycol diester plasticizer, polyester resin plasticizer, aromatic diester plasticizer, aromatic triester plasticizer, aliphatic diester plasticizer, carbonate plasticizer, epoxidized ester plasticizer, epoxidized oil plasticizer, benzoate plasticizer, polyol benzoate plasticizer adipate plasticizer, a phthalate plasticizer, a glycolic acid ester plasticizer, a citric acid ester plasticizer, a hydroxyl-functional plasticizer, or a solid, non-crystalline resin plasticizer. In one subclass of this class, the plasticizer is triethylene glycol 2-ethyl hexanoate. In one embodiment, the flame retardant is present from about 3 wt % to about 10 wt % based on the total weight of the composition. In one class of this embodiment, the flame retardant is an organophosphate compound. In one class of this embodiment, the plasticizer is present from about 1 wt % to about 20 wt % based on the total weight of the composition. In one subclass of this class, the plasticizer is chosen from an aromatic phosphate ester plasticizer, alkyl phosphate ester plasticizer, dialkylether diester plasticizer, tricarboxylic ester plasticizer, polymeric polyester plasticizer, polyglycol diester plasticizer, polyester resin plasticizer, aromatic diester plasticizer, aromatic triester plasticizer, aliphatic diester plasticizer, carbonate plasticizer, epoxidized ester plasticizer, epoxidized oil plasticizer, benzoate plasticizer, polyol benzoate plasticizer adipate plasticizer, a phthalate plasticizer, a glycolic acid ester plasticizer, a citric acid ester plasticizer, a hydroxyl-functional plasticizer, or a solid, non-crystalline resin plasticizer. In one subclass of this class, the plasticizer is triethylene glycol 2-ethyl hexanoate.

Articles and Processes

The present application discloses an article made from the cellulose ester compositions such as molded plastic parts or as solid plastic objects. Examples of such parts or objects include disposable knives, forks, spoons, plates, cups, straws as well as eyeglass frames, toothbrush handles, toys, automotive trim, tool handles, camera parts, parts of electronic devices, razor parts, ink pen barrels, disposable syringes, bottles, and the like. In one embodiment of this article, the cellulose ester compositions of the present invention are useful as plastics, films, fibers, and sheets. In one embodiment of this article, the cellulose ester compositions are useful as plastics to make bottles, bottle caps, eyeglass frames, cutlery, disposable cutlery, cutlery handles, shelving, shelving dividers, electronics housing, electronic equipment cases, computer monitors, printers, keyboards, pipes, automotive parts, automotive interior parts, automotive trim, signs, thermoformed letters, siding, toys, thermally conductive plastics, ophthalmic lenses, tools, tool handles, utensils. In another embodiment, the cellulose ester compositions of the present invention are suitable for use as films, sheeting, fibers, molded articles, medical devices, packaging, bottles, bottle caps, eyeglass frames, cutlery, disposable cutlery, cutlery handles, shelving, shelving dividers, furniture components, electronics housing, electronic equipment cases, computer monitors, printers, keyboards, pipes, toothbrush handles, automotive parts, automotive interior parts, automotive trim, signs, outdoor signs, skylights, multiwall film, thermoformed letters, siding, toys, toy parts, thermally conductive plastics, ophthalmic lenses and frames, tools, tool handles, and utensils, healthcare supplies, commercial foodservice products, boxes, film for graphic arts applications, and plastic film for plastic glass laminates.

The present application also discloses articles formed from the cellulose ester compositions that are fibers, films, molded articles, and sheeting. The methods of forming the cellulose ester compositions into fibers, films, molded articles, and sheeting are well known in the art. Examples of potential molded articles include without limitation: medical devices, medical packaging, healthcare supplies, commercial foodservice products such as food pans, tumblers and storage boxes, bottles, food processors, blender and mixer bowls, utensils, water bottles, crisper trays, washing machine fronts, vacuum cleaner parts and toys. Other potential molded articles could include ophthalmic lenses and frames.

The present application also discloses articles of manufacture comprising the film(s) and/or sheet(s) comprising the cellulose ester compositions described herein. The films and/or sheets of the present invention can be of any thickness which would be apparent to one of ordinary skill in the art.

The invention further relates to the film(s) and/or sheet(s) described herein. The methods of forming the cellulose ester compositions into film(s) and/or sheet(s) are well known in the art. Examples of film(s) and/or sheet(s) of the invention including but not limited to extruded film(s) and/or sheet(s), calendered film(s) and/or sheet(s), compression molded film(s) and/or sheet(s), solution casted film(s) and/or sheet(s). Methods of making film and/or sheet include but are not limited to extrusion, calendering, compression molding, wet block processing, dry block processing and solution casting.

The invention further relates to the molded articles described herein. The methods of forming the cellulose ester compositions into molded articles are well known in the art. Examples of molded articles of the invention including but not limited to injection molded articles, extrusion molded articles, injection blow molded articles, injection stretch blow molded articles and extrusion blow molded articles. Methods of making molded articles include but are not limited to injection molding, extrusion, injection blow molding, injection stretch blow molding, and extrusion blow molding. The processes of the invention can include any blow molding processes known in the art including, but not limited to, extrusion blow molding, extrusion stretch blow molding, injection blow molding, and injection stretch blow molding.

This invention includes any injection blow molding manufacturing process known in the art. Although not limited thereto, a typical description of injection blow molding (IBM) manufacturing process involves: 1) melting the composition in a reciprocating screw extruder; 2) injecting the molten composition into an injection mold to form a partially cooled tube closed at one end (i.e. a preform); 3) moving the preform into a blow mold having the desired finished shape around the preform and closing the blow mold around the preform; 4) blowing air into the preform, causing the preform to stretch and expand to fill the mold; 5) cooling the molded article; 6) ejecting the article from the mold.

This invention includes any injection stretch blow molding manufacturing process known in the art. Although not limited thereto, a typical description of injection stretch blow molding (ISBM) manufacturing process involves: 1) melting the composition in a reciprocating screw extruder; 2) injecting the molten composition into an injection mold to form a partially cooled tube closed at one end (i.e. a preform); 3) moving the preform into a blow mold having the desired finished shape around the preform and closing the blow mold around the preform; 4) stretching the preform using an interior stretch rod, and blowing air into the preform causing the preform to stretch and expand to fill the mold; 5) cooling the molded article; 6) ejecting the article from the mold.

This invention includes any extrusion blow molding manufacturing process known in the art. Although not limited thereto, a typical description of extrusion blow molding manufacturing process involves: 1) melting the composition in an extruder; 2) extruding the molten composition through a die to form a tube of molten polymer (i.e. a parison); 3) clamping a mold having the desired finished shape around the parison; 4) blowing air into the parison, causing the extrudate to stretch and expand to fill the mold; 5) cooling the molded article; 6) ejecting the article of the mold; and 7) removing excess plastic (commonly referred to as flash) from the article.

Cellulose Ester Compositions for Foamed Articles and Foamed Articles

The cellulose ester compositions disclosed in the present application can include a blowing agent. The blowing agent can be infused or blended into the cellulose ester compositions. The resulting cellulose ester compositions comprising the blowing agents can be further treated to form a foam.

Cellulose acetate butyrate ("CAB") has been reported in US Pat. Pub. 2013/0040125 as a foam which could be used as a replacement for foams made from petroleum sources such as polystyrene. However, the butyryl content in the CAB was reported to be at least 20 wt % of the cellulose ester and preferably between 30 wt % and 60 wt %. CABs with such high butyryl inherently comprise low levels of butyric acid and during processing and over time release additional butyric acid. The present application discloses the use of cellulose ester compositions wherein the cellulose ester with high propionyl content that can be foamed. The cellulose ester compositions disclosed in the present application advantageously have low to no butyryl/butyric acid content. However, in order to use the cellulose ester compositions of the present application in foaming applications, the properties of the cellulose ester compositions have to be further tuned with additives such as plasticizers and/or flame retardants at the appropriate ratios to be able to be infused with high levels of certain blowing agents such as alkanes. Another advantage of using cellulose esters with high propionyl content over those with high butyryl content is that the cellulose esters with high propionyl content have a higher modulus and therefore would be expected to form stronger foams.

The foams made from the cellulose ester compositions of the present application can be used to replace foams made from expandable polystyrene ("EPS") for packaging, insulation, and other applications known in the prior art. EPS foams are made polystyrene expandable particles. Therefore, the cellulose ester compositions of the present application can be formed into expandable particles or expandable cellulose ester particles ("ECEP"). The ECEP can be in the form of a bead, pellet or granule with average diameters in the range of from about 0.2 mm to about 10 mm, in the range of from about 0.2 to about 5 mm, in the range of from about 0.4 mm to about 8.5 mm, or in the range of from about 0.4 mm to about 7 mm. The ECEP can for example be spherical or elliptical.

Additives are often added to polymers based on the application, but the additives such as flame retardants can reduce the adhesive properties of the polymer. As a result, the resulting polymers may be rendered unsuitable for applications such as laminated films and sheets, and particles used to make foams. For example, in the making of foams with expanding polymer particles such as EPS, the particles once expanded have to adhere together or else the foam will readily break apart into the individual expanded particles. Therefore, certain other additives can be added to counter the negative consequences caused by additives that reduce the adhesive properties.

When certain flame retardants are added to the cellulose ester compositions the adhesive properties of cellulose ester compositions are negatively affected. To counter the loss in adhesive properties, it was found that plasticizers improved the adhesive properties of the cellulose ester compositions.

This invention can be further illustrated by the following examples of preferred embodiments thereof, although it will be understood that these examples are included merely for purposes of illustration and are not intended to limit the scope of the invention unless otherwise specifically indicated.

Experimental

Abbreviations

BHT is butylated hydroxytoluene; ° C. is degree Celsius; CAP is cellulose acetate propionate; CAP 482-0.5 is Eastman™ cellulose acetate propionate 482-0.5; CAP 482-20 is Eastman™ cellulose acetate propionate 482-20; CE is cellulose ester; Citroflex A2 is acetyl triethyl citrate; Comp. is comparative; Da is Dalton(s); ESO is epoxidated soybean oil (Vikoflex® 7170); Ex is example; GPC is gel permeation chromatography; lb is pound(s); kgf is kilogram-force; mg is milligram; min is minute; mm is millimeter; μl is microliter; ml or mL is milliliter; $M_w$ is weight average molecular weight; RDP is resorcinol bisdiphenyl phosphate (Fryoflex™ RDP); rpm is revolutions per minute; s is second(s); TEG-EH is Triethylene glycol 2-ethyl hexanoate; $T_g$ is glass transition temperature; THF is tetrahydrofuran; UV is ultraviolet; Vis is visible; wt % is weight percent;

EXAMPLES

1. Miscible Blends

Example 1

Ex 1 is Eastman™ CAP 482-20 (100 wt %).

Example 2

Ex 2 is Eastman™ CAP 482-0.5 (100 wt %).

Example 3

Ex 3 is Eastman™ CAP 504-0.2 (100 wt %).

Example 4

A blend of Eastman™ CAP 482-20 (83 wt %) and Eastman™ CAP 482-0.5 (17 wt %) was mixed together by bag blending. The blend was then fed using a loss and weight feeder into an extruder. The blend was compounded using a Leistritz 18 mm twin screw extruder having a 50L1 L/D and a medium shear screw design. The materials were melt compounded at a rate of 8 lb/h at a screw speed of 200 rpm with an increasing temperature profile of 180-230° C.

Examples 5-11 in Table 1 were prepared by adapting the procedure for the preparation of Example 4.

TABLE 1

| Examples 5-11 | |
|---|---|
| Ex # | Description |
| 5 | 65 wt % CAP 482-20 and 35 wt % CAP 482-0.5 |
| 6 | 42 wt % CAP 482-20 and 58 wt % CAP 482-0.5 |
| 7 | 95 wt % CAP 482-20 and 5 wt % CAP 504-0.2 |
| 8 | 87 wt % CAP 482-20 and 13 wt % CAP 504-0.2 |
| 9 | 72 wt % CAP 482-20 and 28 wt % CAP 504-0.2 |
| 10 | 65 wt % CAP 482-20 and 35 wt % CAP 504-0.2 |
| 11 | 57 wt % CAP 482-20 and 43 wt % CAP 504-0.2 |

Ex 1-3 were analyzed to determine their acetyl, propionyl, hydroxyl and ASTM(A) viscosity.

Determination of Propionyl and Acetyl Content

A weighed portion of dry sample is dissolved in a known amount of a solvent/internal standard solution. After dissolution, the sample is hydrolyzed in a potassium hydroxide solution, followed by acidification, mixing, and filtration. The prepared sample is chromatographed on a DB™-FFAP fused silica capillary column using programmed temperature development and flame ionization detection. The concentrations of sample components are calculated from the integrated chromatogram using internal standardization.

Determination of Hydroxyl Content

The sample is dissolved in pyridine and the hydroxyl sites are acetylated with acetic anhydride in the presence of a basic catalyst, 1-methylimidazole. The excess acetic anhydride is hydrolyzed, and the resulting acetic acid is titrated with sodium hydroxide. An automatic titrator dispenses the titrant, potentiometrically determines the endpoint, and calculates the percent hydroxyl based on a blank determination Determination of ASTM(A) Viscosity The cellulose ester is dried. A designated amount of dried ester and solvent are added to a bottle and the ester is dissolved by shaking, tumbling, or mixing. The sample is placed in a 25° C. constant temperature bath for 1 h. The sample is removed from the bath and placed in a laser beam viscometer where two successive balls of constant weight and size are dropped into the solution. The times for the balls to fall a distance of 2.25 inches is measured. An average ASTM(A) viscosity is reported for the sample.

TABLE 2

| Ex # | Ac wt % (DS$_{Ac}$) | Pr wt % (DS$_{Pr}$) | OH wt % (DS$_{OH}$) | ASTM(A) Viscosity (poise) |
|---|---|---|---|---|
| 1 | 1.17 (0.08) | 47.27 (2.56) | 1.70 (0.35) | 19.24 |
| 2 | 1.19 (0.08) | 46.13 (2.45) | 2.49 (0.47) | 0.402 |
| 3 | 0.40 (0.03) | 42.41 (2.08) | 5.22 (0.89) | 0.17 |

Examples 1-11 were Analyzed to Determine their T$_g$'s and Molecular Weights

T$_g$ Determination by DSC

The modulated DSC tests of Eastman™ CAP-482-20/Eastman™ CAP-482-0.5 blends and Eastman™ CAP-482-20/Eastman™ CAP-504-0.2 blends were performed under helium on a TA Instrument Q2000 DSC, which is connected to a liquid nitrogen cooling system. 4-7 mg samples were crimped in aluminum pans. These samples were heated from 0° C. to 195° C. twice at a rate of 5° C./min, with temperature modulation amplitude of ±0.531° C./min and a temperature modulation period of 40 s. The samples were equilibrated to 0° C. as fast as possible between the two heating scans.

All the modulated DSC data analysis was completed by using a TA Instrument Universal Analysis 2000 software. The enthalpy relaxation peak got separated and marked on the non-reversible heat flow curve. The T$_g$ results were analyzed from the reversible heat flow curve.

Molecular Weight Determination by GPC

M$_w$ was measured using THF to determine the absolute M$_w$ of the CE. The instrumentation for the THF/cellulose ester procedure consists of the following Agilent 1200 series components: degasser, isocratic pump, auto-sampler, column oven, UV/Vis detector and a refractive index detector). The following method is used to calculate the absolute molecular weight values for CE. The solvent is THF stabilized with BHT Preservative. The test temperature is 30° C. and flow rate is 1.0 ml/min. A sample solution of 25 mg Cellulose Ester in 10 ml THF with BHT preservative+10 μl toluene flow rate marker as made. The injection volume is 50 μl. The column set is Polymer Laboratories 5 μm PLgel, Guard+Mixed C+Oligopore. The detection is by refractive index. The calibrants are monodisperse polystyrene standards, M$_w$=580 to 3,220,000 from Polymer Laboratories. The universal calibration parameters are as follows: PS (K=0.0001280 and a=0.7120) and CA (K=0.00007572 and a=0.8424). The universal calibration parameters above were determined by light scattering and viscometery to yield the correct weight average molecular weights.

TABLE 3

| Ex. # | T$_g$ (° C.) 1$^{st}$ | T$_g$ (° C.) 2$^{nd}$ | Mw (Da) |
|---|---|---|---|
| 1 | 142 | — | 124,224 |
| 2 | 147 | — | 42,100 |
| 4 | 142 | — | 108,724 |
| 5 | 143 | — | 92,138 |
| 6 | 144 | — | 73,713 |
| 7 | 142 | 170 | 115449 |
| 8 | 142 | 166 | 104,506 |
| 9 | 142 | 164 | 88,605 |

TABLE 3-continued

| Ex. # | T$_g$ (° C.) 1$^{st}$ | T$_g$ (° C.) 2$^{nd}$ | Mw (Da) |
|---|---|---|---|
| 10 | 143 | 165 | 85,871 |
| 11 | 142 | 167 | 78,589 |

2. Cellulose Ester/Plasticizer Blends

Example 12

Eastman™ CAP 482-20 was compounded with TEG-EH in a 30 mm Werner Pfleidder twin screw extruder using a low shear screw design to promote distributive mixing. The material was compounded between 190° C. and 230° C. at screw speeds of 225 to 250 rpm. The final composition was Eastman™ CAP 482-20 (90 wt %) and TEG-EH (10 wt %).

Ex 13-15 were prepared by adapting the procedure for the preparation of Ex 12.

TABLE 4

| Ex. # | Cellulose Ester (wt %) | wt % TEG-EH |
|---|---|---|
| 13 | Eastman ™ CAP 482-0.5 (90) | 10 |
| 14 | Eastman ™ CAP 482-20 (80) | 20 |
| 15 | Eastman ™ CAP 482-0.5 (80) | 20 |

Example 16

Eastman™ CAP 482-20 and Eastman™ CAP 482-0.5 were first mixed together by bag blending. Then the blend was compounded with TEG-EH in a 30 mm Werner Pfleidder twin screw extruder using a low shear screw design to promote distributive mixing. The material was compounded between 190° C. and 230° C. at screw speeds of 225 to 250 rpm. The plasticizer was injected directly into the barrel using a mechanical pump and weight loss liquid feed system. The material was pelletized and then dried at 70° C. for 6 h. The final composition was Eastman™ CAP 482-20 (82.8 wt %), Eastman™ 482-0.5 (7.2 wt %) and TEG-EH (10 wt %).

Ex 17-28 were prepared by adapting the procedure for the preparation of Ex 16.

TABLE 5

| Ex # | wt % Eastman ™ CAP 480-20 | wt % Eastman ™ CAP 480-0.5 | Plasticizer (wt %) |
|---|---|---|---|
| 17 | 72.0 | 18.0 | TEG-EH (10.0) |
| 18 | 56.7 | 33.3 | TEG-EH (10.0) |
| 19 | 40.5 | 49.5 | TEG-EH (10.0) |
| 20 | 18.0 | 72.0 | TEG-EH (10.0) |
| 21 | 73.6 | 6.4 | TEG-EH (20) |
| 22 | 64.0 | 16.0 | TEG-EH (20) |
| 23 | 50.4 | 29.6 | TEG-EH (20) |
| 24 | 36.0 | 44.0 | TEG-EH (20) |
| 25 | 16.0 | 64.0 | TEG-EH (20) |
| 26 | 64.0 | 16.0 | RDP (20) |
| 27 | 50.4 | 29.6 | RDP (20) |
| 28 | 36.0 | 44.0 | RDP (20) |

Preparation of Flex Bar, Tensile Bars, and 10.2 cm by 10.2 cm Plaques of 3.2 mm Thickness Flex bars, tensile bars, and 10.2 cm by 10.2 cm plaques of one 3.2 mm thickness were injection molded on a 90 ton Toyo molding machine model number 1087031. The processing temperature on the molding machine was adjusted to account for the viscosity of the materials, with the highest melt flow rate material (lowest viscosity) being processed at 160° C. to 180° C. while the highest viscosity material was processed between 220° C. to 240° C. The mold temperature was controlled at 23° C.

Melt Flow Rate (MFR) as Measured by ASTM D 1238

Melt flow rate (MFR) was measured by ASTM D 1238 method B in units of g 10-min$^{-1}$. Test conditions were 200° C./5 kg and samples were dried at 70° C. for 4 h in a mechanical convection oven prior to testing. The melt density was assumed in converting the melt volume flow-rate, MVR, to the MFR. Measurements were performed using a CEAST 7027 extrusion plastometer.

Energy at Maxload as Measured by ASTM D 3763

The energy at maxload was determined by testing a 10.2 mm by 10.2 mm by 3.2 mm thick plaque in accordance with ASTM D3763. The testing was completed at room temperature and the energy at maxload is reported. An average of 5 specimens was tested.

TABLE 6

10 wt % TEG-EH

| Ex. # | Melt Flow Rate, 200° C., 5 Kg g/100 min | $M_w$ | ASTM D3763, Energy at Maxload (joules) |
|---|---|---|---|
| 12 | 7.3 | 126,200 | 37.6 |
| 16 | 13.2 | 109,948 | 39.2 |
| 17 | 16.2 | 102,061 | 39.0 |
| 18 | 22.9 | 87,172 | 37.0 |
| 19 | 38.0 | 77,380 | 27.1 |
| 20 | 63.3 | 53,788 | 3.5 |
| 14 | 94.2 | 43,607 | 0.7 |

TABLE 7

20 wt % TEG-EH

| Ex. # | Melt Flow Rate, 200° C., 5 Kg g/100 min | $M_w$ | ASTM D3763, Energy at Maxload (joules) |
|---|---|---|---|
| 14 | 46.6 | 133,564 | 33.8 |
| 21 | 108.7 | 114,425 | 33.0 |
| 22 | 129.3 | 107,722 | 33.7 |
| 23 | 184.6 | 94,771 | 30.3 |
| 24 | 263 | 79,834 | 26.7 |
| 25 | 263 | 62,070 | 18.0 |
| 15 | 263 | 43,729 | 22.6 |

TABLE 8

20 wt % RDP

| Ex. # | Melt Flow Rate, 200° C., 5 Kg g/100 min | $M_w$ | ASTM D3763, Energy at Maxload (joules) |
|---|---|---|---|
| 26 | 35.6 | 104,382 | 30.7 |
| 27 | 45.1 | 93,117 | 21.8 |
| 28 | 75.0 | 80,321 | 19.7 |

TABLE 9

Comparative Examples

| Comp. Ex. # | Polymer | MFR, 200° C., 5 Kg g/100 min | $M_w$ | ASTM D3763, Energy at Maxload (joules) |
|---|---|---|---|---|
| 1 | Eastman Eastar™ PETG | 4.0 | ~40,000 | 28 |
| 2 | Eastman Eastar™ 5011 | 12.2 | ~30,000 | 28 |

3. Pentane Infusion

Ex 29-43 in Table 10 were prepared by mixing the cellulose esters and plasticizers followed by melt blending the mixtures using a small mixing bowl on a Brabender®. The standard conditions used for mixing the cellulose esters were as follows: 180° C. for 3 min after all of the material was placed in the bowl at 120 rpm screw speed. The samples were then ground up non-cryogenically through a 1 mm screen and then ran through the DACA Instruments micro-compounder to produce a strand. These strands were then run through a chopper to produce pellets. The pellets were sieved to isolate only those that were 1.0-1.3 mm in size.

The pellets were infused with pentane as follows. At rt, the pellets were placed into the catalyst basket and record the weight of the pellets and basket. The basket was mounted up position on the autoclave head to minimize any chance of the pellets to come in contact with the liquid components. The autoclave was sealed and pressure checked with ~300 psig nitrogen and then vented. The blowcase discharge line was connected to the gas inlet/diptube on the autoclave and the system was charged the pentane and weight of the pentane charged was recorded. The system was then vented with 50 psig nitrogen three times. Then, vacuum was pulled on the autoclave and on the blowcase discharge and held ~3 mins to target ~13 psig on the pressure gauge. Then vacuum was stopped on the autoclave and the vacuum supply/vent valve was closed and the gas inlet needle valve was also closed. The needle valve was slowly opened on the autoclave to start the pentane delivery and vacuum/pressure gauge to target a ~1 psig increase every 15 to 30 seconds to minimize any chance of pentane splashing onto the pellets. Pentane was added until all material had been used and 0 to −1 psig was visible on the pressure gauge.

Next, all valves were closed and autoclave was heated at 100° C. for 2 h. Once the desired time is reached, the resulting pressure was maintained with nitrogen cool down occurred slowly to minimize pressure drop. Once the pressure has stabilized, then full cooling can be applied and the sampled cooled to room temperature. Slowly vent the autoclave and open and immediately remove the pellets and record the weight of the catalyst basket.

A 0.5 g pentane entrained cellulose ester sample was weighed on an analytical balance and placed on a Mark 3 moisture analyze. The sample was held for 9 seconds to stabilize the weight on the scale prior to heating it to 150° C. The sample was cooled to room temperature and reweighed on the same analytical balance.

Since cellulose esters absorb water, it was important to account for water uptake during weighing process. To do this, a sample with no pentane was weighed on the analytical balance and then heated on the Mark 3 moisture analyzer and reweighed on that analytical balance. This moisture content was subtracted from all the pentane entrained samples to minimize water increasing the weight gain of the samples. The initial weight percent pentane is calculated using the following equations:

Calculations $$\% \text{ Water} = \frac{\text{Initial weight of sample} - \text{Weight of sample after analysis}}{\text{Initial weight of sample}} * 100 \quad \text{Equation 1}$$

$$\% \text{ Weight Loss} = \frac{\text{Initial weight of sample} - \text{Weight of sample after analysis}}{\text{Initial weight of sample}} * 100 \quad \text{Equation 2}$$

Initial Weight % of Pentane = % Weight loss − % Water   Equation 3

TABLE 10

| Ex. # | CE (wt %) | Plasticizer (wt %) | $M_w$ (Da) | Pentane Uptake (wt %) |
|---|---|---|---|---|
| 29 | CAP 482-20 (77) | RDP (23) | 107,155 | 3.3 |
| 30 | CAP 482-0.5 (77) | RDP (23) | 42,255 | 3.2 |
| 31 | CAP 482-20 (60.8)/CAP 482-0.5 (16.2) | RDP (23) | 93,257 | 3.1 |
| 32 | CAP 482-20 (46.2)/CAP 482-0.5 (30.8) | RDP (23) | 83,605 | 3.1 |
| 33 | CAP 482-20 (46.2)/CAP 482-0.5 (30.8) | RDP (11.5)/ ESO (11.5) | 85,768 | 8.9 |
| 34 | CAP 482-20 (46.2)/CAP 482-0.5 (30.8) | RDP (11.5)/ ESO TEG-EH (11.5) | 64,979 | 7.0 |
| 35 | CAP 482-20 (58.5)/CAP 482-0.5 (20.5) | RDP (19)/ ESO (2) | 91,194 | 2.9 |
| 36 | CAP 482-20 (59.1)/CAP 482-0.5 (20.7) | RDP (16.2)/ESO (4.0) | 90,742 | 3.3 |
| 37 | CAP 482-20 (59.7)/CAP 482-0.5 (20.9) | RDP (13.3)/ ESO(6.1) | 89,379 | 3.8 |
| 38 | CAP 482-20 (59.1)/CAP 482-0.5 (20.7) | RDP(4.0)/ESO (16.2) | 90,141 | 8.7 |
| 39 | CAP 482-20 (58.5)/CAP- 482-0.5 (20.5) | ESO (21) | 87,628 | 9.6 |
| 40 | CAP 482-20 (58.5)/CAP 482-0.5 (20.5) | RDP (19)/TEG- EH (2) | 77,813 | 3.2 |
| 41 | CAP 482-20 (59.1)/CAP- 482-0.5 (20.7) | RDP (16.2)/TEG- EH (4) | 73,387 | 3.6 |
| 42 | CAP 482-20 (59.7)/CAP 482-0.5 (20.9) | RDP (13.3)/ TEG-EH (6.1) | 71,136 | 4.2 |
| 43 | CAP 482-20 (46.2)/CAP 482-0.5 (30.8) | RDP (11.5)/Citroflex A2 (11.5) | 81,358 | 6.1 |

4. Adhesion

CAP 482-20 was compounded with additives on a 30 mm Werner Pfleidder twin screw extruder using a low shear screw design to promote distributive mixing. The material was compounded between 190° C. and 230° C. at screws speeds of 225 to 250 rpms. The compounded materials were then extruded on a Killion 1 inch laboratory extruder having a 24:1 length/diameter ratio. Samples of CAP 482-20 containing TEG-EH (20 wt %), CAP 482-20 containing RDP (20 wt %), and blends of the two were produced on the Killion extruder. Several 0.010 inch (10 mil) film samples were made by extruding these two samples as well as blends of these two samples The 10 mils films were then heat laminated on a Packworld Vertical Heat Sealing Machines, PW3024 at a temperature of 130° C. for a time of 5 seconds. Before releasing, the laminated film was cooled to 70° C. The bond width area was 2.54 cm. Prior to testing, the laminated sample was cut to 2.54 cm test strips. Tensile peel testing was conducted using a Mark-10 Corporation ESM303 single column force tester. The amount of energy required to pull the adhesive bond apart was measured. This process was repeated for 10 replicates of each sample and the average force was recorded.

For samples containing a flame retardant additive such as RDP, the adhesion can be improved by keeping the total level of plasticizer the sample and blending in additional additives such as TEG-EH. We can see from the examples that when TEG-EH is as little as 25 wt % (5 wt % out of a total of 20 wt %) of the overall plasticizer blend then adhesion can increase by a factor of 10 fold under these test conditions.

Example 44

Ex 44 is a film containing CAP 482-20 (80 wt %) and TEG-EH (20 wt %) was laminated and tested for adhesion using the protocol outlined previously. The adhesive force of the laminated structure as tested was 3.29 kgf.

Example 45

Ex 45 is a film containing CAP 482-20 (80 wt %), RDP (5 wt %), and Eastman™ TEG-EH (15 wt %). The adhesive force of the laminated structure tested was 1.6 kgf.

Example 46

Ex 46 is a film containing CAP 482-20 (80 wt %), RDP (12.5 wt %) and Eastman™ TEG-EH (7.5 wt %). The adhesive force of the laminated structure tested was 0.847 kgf.

Example 47

Ex 47 is a film made from CAP 482-20 (80 wt %), RDP (15 wt %) and Eastman™ TEG-EH (5 wt %). The adhesive force of the laminated structure tested was 0.305 kgf.

Example 48

Ex 48 is a film made from CAP 482-20 (80 wt %) and RDP (20 wt %). The adhesive force of the laminated structure tested was 0.031 kgf.

TABLE 11

Summary of Adhesion Results

| Ex # | Average Force (kgf) | TEG-EH % of total additive |
|---|---|---|
| 44 | 3.29 | 100% |
| 45 | 1.6 | 75% |
| 46 | 0.847 | 37.5% |

TABLE 11-continued

Summary of Adhesion Results

| Ex # | Average Force (kgf) | TEG-EH % of total additive |
|---|---|---|
| 47 | 0.305 | 25% |
| 48 | 0.031 | 0% |

EMBODIMENTS

Embodiment 1

A cellulose ester composition comprising:
(a) a first cellulose ester comprising:
  (i) a plurality of propionyl substituents,
  (ii) a plurality of acetyl substituents,
  (iii) a plurality of hydroxyl substituents,
    wherein the degree of substitution of the propionyl substituent of the first cellulose ester ("$DS_{Pr1}$") is in the range of from about 1.1 to about 2.87,
    wherein the degree of substitution of the acetyl substituent of the first cellulose ester ("$DS_{Ac1}$") is in the range of from about 0 to about 0.3,
    wherein the degree of substitution of the hydroxyl substituent of the first cellulose ester ("$DS_{OH1}$") is in the range of from about 0.05 to about 0.7,
    wherein the weight average molecular weight of the first cellulose ester ("$M_{w1}$") is in the range of from about 60,000 Da to about 200,000 Da; and
(b) a second cellulose ester comprising:
  (i) a plurality of propionyl substituents,
  (ii) a plurality of acetyl substituents, and
  (iii) a plurality of hydroxyl substituents,
    wherein the degree of substitution of the propionyl substituent the second cellulose ester ("$DS_{Pr2}$") is in the range of from about 1.1 to about 2.87,
    wherein the degree of substitution of the acetyl substituent of the cellulose ester ("$DS_{Ac2}$") is in the range of from about 0 to about 0.3,
    wherein the degree of substitution of the hydroxyl substituent of the cellulose ester ("$DS_{OH2}$") is in the range of from about 0.05 to about 0.7,
    wherein the weight average molecular weight of the second cellulose ester ("$M_{w2}$") is in the range of from about 15,000 Da to about 60,000 Da;
wherein the weight average molecular weight of the cellulose ester composition ("$M_w$") is greater than $M_{w2}$ but less than $M_{w1}$,
wherein $M_w$, $M_{w1}$, and $M_{w2}$ are determined by gel permeation chromatography ("GPO") using tetrahydrofuran ("THF") as a solvent,
wherein the first cellulose ester and the second cellulose ester are miscible,
wherein the cellulose ester composition has a single glass transition temperature ("$T_g$").

Embodiment 2

The cellulose ester composition of Embodiment 1, wherein the weight average molecular weight of the first cellulose ester ("$M_{w1}$") is in the range of from about 100,000 Da to about 200,000 Da.

Embodiment 3

The cellulose ester composition of any one of Embodiments 1-2, wherein the second cellulose ester is present in the range of from about 4 wt % to about 60 wt % based on the total weight of the composition.

Embodiment 4

The cellulose ester composition of any one of Embodiments 1-3, wherein the $DS_{Pr1}$ is in the range of from about 2.1 to about 2.87, wherein the $DS_{Ac1}$ is in the range of from about 0.08 to about 0.3, wherein the $DS_{Pr2}$ is in the range of from about 2.1 to about 2.87, and wherein the $DS_{Ac2}$ is in the range of from about 0.08 to about 0.3.

Embodiment 5

The cellulose ester composition of any one of Embodiments 1-4, wherein the cellulose ester composition is not compostable.

Embodiment 6

The cellulose ester composition of any one of Embodiments 1-5, wherein the cellulose ester composition is binary with respect to the cellulose ester components.

Embodiment 7

The cellulose ester composition of any one of Embodiments 1-6, wherein the cellulose ester composition is prepared without a solvent.

Embodiment 8

The cellulose ester composition of any one of Embodiments 1-7, wherein the cellulose ester composition is prepared by a melt process.

Embodiment 9

The cellulose ester composition of any one of Embodiments 1-8, further comprising about 3 wt % to about 30 wt %, based on the total weight of the composition, of an additive chosen from a plasticizer or a flame retardant.

Embodiment 10

The cellulose ester composition of Embodiment 9, wherein the plasticizer is chosen from an aromatic phosphate ester plasticizer, alkyl phosphate ester plasticizer, dialkylether diester plasticizer, tricarboxylic ester plasticizer, polymeric polyester plasticizer, polyglycol diester plasticizer, polyester resin plasticizer, aromatic diester plasticizer, aromatic triester plasticizer, aliphatic diester plasticizer, carbonate plasticizer, epoxidized ester plasticizer, epoxidized oil plasticizer, benzoate plasticizer, polyol benzoate plasticizer adipate plasticizer, a phthalate plasticizer, a glycolic acid ester plasticizer, a citric acid ester plasticizer, a hydroxyl-functional plasticizer, or a solid, non-crystalline resin plasticizer.

Embodiment 11

The cellulose ester composition of Embodiment 10, wherein the plasticizer is chosen from triethylene glycol 2-ethyl hexanoate, epoxidized soybean oil, or acetyl triethyl citrate.

Embodiment 12

The cellulose ester composition of Embodiment 9, wherein the flame retardant is an organophosphorous compound.

Embodiment 13

The cellulose ester composition of Embodiment 12, wherein the organophosphorous compound is chosen from resorcinol bisdiphenyl phosphate, bisphenol A diphenyl phosphate, resorcinol bis(di-2,6-xylyl phosphate), tricresyl phosphate, dimethyl methylphosphonate, aluminum diethyl phosphinate, tris(2,3-dibromopropyl)phosphate, tris(1,3-dichloro-2-propyl)phosphate, or tetrakis(2-chloroethyl)dichloroisopentyldiphosphate.

Embodiment 14

The cellulose ester composition of Embodiment 13, wherein the organophosphorous compound is resorcinol bisdiphenyl phosphate.

Embodiment 15

The cellulose ester composition of any one of Embodiments 1-14 or 9, wherein the melt flow rate ("MFR") of the cellulose ester composition is greater than about 3 g/10 min as determined by ASTM D1238, method B using a temperature of 200° C. and a 5 kg weight.

Embodiment 16

The cellulose ester composition of any one of Embodiments 1-16, wherein the energy at maxload is greater than about 5 joules as determined by ASTM D3763 using a 10.2 cm×10.2 cm×0.32 cm plaque formed from the cellulose ester composition.

Embodiment 17

The cellulose ester composition of any one of Embodiments 1-16, wherein when two 0.254 mm film strips having a width of 2.54 cm formed from the cellulose ester composition are heat laminated at 130° C. for 5 s, the average tensile peel strength force is in the range of from about 0.2 kg-force to about 10.0 kg-force.

Embodiment 18

The cellulose ester composition of any one of Embodiment 1-17, further comprising about 2 wt % to about 12 wt % of a blowing agent.

Embodiment 19

The cellulose ester composition of Embodiment 18, wherein the blowing agent is one or more of an $(C_{1-5})$alkane.

Embodiment 20

An article comprising the composition of any one of Embodiments 1-19.

Embodiment 21

A cellulose ester composition comprising a cellulose ester blend and a blowing agent;
wherein the cellulose ester blend comprises:
(a) an additive chosen from a plasticizer or a flame retardant;
(b) a first cellulose ester comprising:
(i) a plurality of propionyl substituents,
(ii) a plurality of acetyl substituents,
(iii) a plurality of hydroxyl substituents,
wherein the degree of substitution of the propionyl substituent of the first cellulose ester ("$DS_{Pr1}$") is in the range of from about 1.1 to about 2.87,
wherein the degree of substitution of the acetyl substituent of the first cellulose ester ("$DS_{Ac1}$") is in the range of from about 0 to about 0.3,
wherein the degree of substitution of the hydroxyl substituent of the first cellulose ester ("$DS_{OH1}$") is in the range of from about 0.05 to about 0.7,
wherein the weight average molecular weight of the first cellulose ester ("$M_{w1}$") is in the range of from about 60,000 Da to about 200,000 Da; and
(c) a second cellulose ester comprising:
(i) a plurality of propionyl substituents,
(ii) a plurality of acetyl substituents, and
(iii) a plurality of hydroxyl substituents,
wherein the degree of substitution of the propionyl substituent the second cellulose ester ("$DS_{Pr2}$") is in the range of from about 1.1 to about 2.87,
wherein the degree of substitution of the acetyl substituent of the cellulose ester ("$DS_{Ac2}$") is in the range of from about 0 to about 0.3,
wherein the degree of substitution of the hydroxyl substituent of the cellulose ester ("$DS_{OH2}$") is in the range of from about 0.05 to about 0.7,
wherein the weight average molecular weight of the second cellulose ester ("$M_{w2}$") is in the range of from about 15,000 Da to about 60,000 Da;
wherein the weight average molecular weight of the cellulose ester composition ("$M_w$") is greater than $M_{w2}$ but less than $M_{w1}$,
wherein $M_w$, $M_{w1}$, and $M_{w2}$ are determined by GPC using tetrahydrofuran ("THF") as a solvent,
wherein the first cellulose ester is present in the range of from about 40 wt % to about 95 wt % based on the total weight of the cellulose ester blend,
wherein the second cellulose ester is present in the range of from about 0 wt % to about 55 wt % based on the total weight of the composition,
wherein the additive is present in the range of from about 1 wt % to about 30 wt % based on the total weight of the cellulose ester blend
wherein when the second cellulose ester is present, the first cellulose ester and the second cellulose ester are miscible, and
wherein the blowing agent is present in the range of from about 2 wt % to about 12 wt % based on the total weight of the cellulose ester composition.

Embodiment 22

The cellulose ester composition of Embodiment 21, wherein the $DS_{Pr1}$ is in the range of from about 2.1 to about 2.87, wherein the $DS_{Ac1}$ is in the range of from about 0.08 to about 0.3, wherein the $DS_{Pr2}$ is in the range of from about 2.1 to about 2.87, and wherein the $DS_{Ac2}$ is in the range of from about 0.08 to about 0.3.

Embodiment 23

The cellulose ester composition of Embodiment 21 wherein the cellulose ester blend is not compostable.

Embodiment 24

The cellulose ester composition of any one of Embodiments 21-23, wherein the cellulose ester blend has a single glass transition temperature ("$T_g$").

Embodiment 25

The cellulose ester composition of any one of Embodiments 21-24, wherein the $M_{w1}$ is in the range of from about 60,000 Da to about 100,000 Da, and wherein the second cellulose ester is present in a range of from about 0 wt % to about 10 wt %.

Embodiment 26

The cellulose ester composition of any one of Embodiments 21-25, wherein the melt flow rate ("MFR") of the cellulose ester blend is greater than about 3 g/10 min as determined by ASTM D1238, method B using a temperature of 200° C. and a 5 kg weight.

Embodiment 27

The cellulose ester composition of any one of Embodiments 21-26, wherein the energy at maxload is greater than about 5 joules as determined by ASTM D3763 using a 10.2 cm×10.2 cm×0.32 cm plaque formed from the cellulose ester blend.

Embodiment 28

The cellulose ester composition of any one of Embodiments 21-27, wherein when two 0.254 mm film strips having a width of 2.54 cm formed from the cellulose ester blend are heat laminated at 130° C. for 5 s, the average tensile peel strength force is in the range of from about 0.2 kg-force to about 10.0 kg-force.

Embodiment 29

The cellulose ester composition of any one of Embodiments 21-28, wherein the blowing agent is one or more of an ($C_{1-5}$) alkane.

Embodiment 30

The cellulose ester composition of any one of Embodiments 21-29, wherein the blowing agent is infused into the cellulose ester blend.

Embodiment 31

The cellulose ester composition of Embodiments 21-30, wherein the plasticizer is chosen from an aromatic phosphate ester plasticizer, alkyl phosphate ester plasticizer, dialkylether diester plasticizer, tricarboxylic ester plasticizer, polymeric polyester plasticizer, polyglycol diester plasticizer, polyester resin plasticizer, aromatic diester plasticizer, aromatic triester plasticizer, aliphatic diester plasticizer, carbonate plasticizer, epoxidized ester plasticizer, epoxidized oil plasticizer, benzoate plasticizer, polyol benzoate plasticizer adipate plasticizer, a phthalate plasticizer, a glycolic acid ester plasticizer, a citric acid ester plasticizer, a hydroxyl-functional plasticizer, or a solid, non-crystalline resin plasticizer.

Embodiment 32

The cellulose ester composition of Embodiment 31, wherein the plasticizer is chosen from triethylene glycol 2-ethyl hexanoate, epoxidized soybean oil, or acetyl triethyl citrate.

Embodiment 33

The cellulose ester composition of Embodiment 21, wherein the flame retardant is an organophosphorous compound.

Embodiment 34

The cellulose ester composition of Embodiment 33, wherein the organophosphorous compound is chosen from resorcinol bisdiphenyl phosphate, bisphenol A diphenyl phosphate, resorcinol bis(di-2,6-xylyl phosphate), tricresyl phosphate, dimethyl methylphosphonate, aluminum diethyl phosphinate, tris(2,3-dibromopropyl)phosphate, tris(1,3-dichloro-2-propyl)phosphate, or tetrakis(2-chloroehtyl)dichloroisopentyldiphosphate.

Embodiment 35

The cellulose ester composition of Embodiment 34, wherein the organophosphorous compound is resorcinol bisdiphenyl phosphate.

Embodiment 36

An article comprising the cellulose ester composition of any one of Embodiments 21-35.

Other embodiments will be apparent to those skilled in the art from consideration of the specification and practice of the embodiments disclosed herein. It will be understood that variations and modifications can be effected within the spirit and scope of the disclosed embodiments. It is further intended that the specification and examples be considered as exemplary only, with a true scope and spirit of the disclosed embodiments being indicated by the following.

We claim:
1. A cellulose ester composition comprising:
 (a) a first cellulose ester comprising:
  (i) a plurality of propionyl substituents,
  (ii) a plurality of acetyl substituents,
  (iii) a plurality of hydroxyl substituents,
   wherein the degree of substitution of the propionyl substituent of the first cellulose ester ("$DS_{Pr1}$") is in the range of from about 1.1 to about 2.87,
   wherein the degree of substitution of the acetyl substituent of the first cellulose ester ("$DS_{Ac1}$") is in the range of from greater than 0 to about 0.3,
   wherein the degree of substitution of the hydroxyl substituent of the first cellulose ester ("$DS_{OH1}$") is in the range of from about 0.05 to about 0.7, wherein the weight average molecular weight of the first cellulose ester ("$M_{w1}$") is in the range of from about 60,000 Da to about 200,000 Da; and
(b) a second cellulose ester comprising:
(i) a plurality of propionyl substituents,
(ii) a plurality of acetyl substituents, and
(iii) a plurality of hydroxyl substituents,
wherein the degree of substitution of the propionyl substituent the second cellulose ester ("$DS_{Pr2}$") is in the range of from about 1.1 to about 2.87,
wherein the degree of substitution of the acetyl substituent of the cellulose ester ("$DS_{Ac2}$") is in the range of from greater than 0 to 0.3,
wherein the degree of substitution of the hydroxyl substituent of the cellulose ester ("$DS_{OH2}$") is in the range of from about 0.05 to about 0.7,
wherein the weight average molecular weight of the second cellulose ester ("$M_{w2}$") is in the range of from about 15,000 Da to about 60,000 Da;
wherein the weight average molecular weight of the cellulose ester composition ("$M_w$") is greater than $M_{w2}$ but less than $M_{w1}$,
wherein $M_w$, $M_{w1}$, and $M_{w2}$ are determined by gel permeation chromatography ("GPC") using tetrahydrofuran ("THF") as a solvent,
wherein the first cellulose ester and the second cellulose ester are miscible,
wherein the cellulose ester composition has a single glass transition temperature ("$T_g$"),
wherein the cellulose ester composition further comprises 2 wt. % to 12 wt. % of a blowing agent,
wherein the cellulose ester composition further comprises 10 wt. % to 30 wt. % of an additive chosen from a plasticizer or a flame retardant, the plasticizer is chosen from triethylene glycol 2-ethyl hexanoate, epoxidized soybean oil, or acetyl triethyl citrate, and the flame retardant is an organophosphorous compound chosen from resorcinol bisdiphenyl phosphate, bisphenol A diphenyl phosphate, resorcinol bis(di-2,6-xylyl phosphate), or tricresyl phosphate, and
wherein when the cellulose ester composition comprises a flame retardant, it further comprises another additive to improve the adhesive properties, wherein said another additive is different from the said flame retardant and said another additive is a plasticizer.

2. The cellulose ester composition of claim 1, wherein the weight average molecular weight of the first cellulose ester ("$M_{w1}$") is in the range of from about 100,000 Da to about 200,000 Da.

3. The cellulose ester composition of claim 1, wherein the second cellulose ester is present in the range of from about 4 wt % to about 60 wt % based on the total weight of the composition.

4. The cellulose ester composition of claim 1, wherein the $DS_{Pr1}$ is in the range of from about 2.1 to about 2.87, and wherein the $DS_{Pr2}$ is in the range of from about 2.1 to about 2.87.

5. The cellulose ester composition of claim 1, wherein the cellulose ester composition is not compostable.

6. The cellulose ester composition of claim 1, wherein the cellulose ester composition is binary with respect to the cellulose ester components.

7. The cellulose ester composition of claim 1, wherein the cellulose ester composition is prepared without a solvent.

8. The cellulose ester composition of claim 1, wherein the cellulose ester composition is prepared by a melt process.

9. The cellulose ester composition of claim 1, wherein the cellulose ester composition comprises about 20 wt % to about 30 wt %, based on the total weight of the composition, of an additive chosen from a plasticizer or a flame retardant.

10. The cellulose ester composition of claim 1, wherein the organophosphorous compound is resorcinol bisdiphenyl phosphate.

11. The cellulose ester composition of claim 1, wherein the melt flow rate ("MFR") of the cellulose ester composition is greater than about 3 g/10 min as determined by ASTM D1238, method B using a temperature of 200° C. and a 5 kg weight.

12. The cellulose ester composition of claim 1, wherein the energy at maxload is greater than about 5 joules as determined by ASTM D3763 using a 10.2 cm×10.2 cm×0.32 cm plaque formed from the cellulose ester composition.

13. The cellulose ester composition of claim 1, wherein when two 0.254 mm film strips having a width of 2.54 cm formed from the cellulose ester composition are heat laminated at 130° C. for 5 s, the average tensile peel strength force is in the range of from about 0.2 kg-force to about 10.0 kg-force.

14. The cellulose ester composition of claim 1, wherein the cellulose ester composition comprises about 5 wt % to about 12 wt % of a blowing agent.

15. The cellulose ester composition of claim 14, wherein the blowing agent is one or more of an ($C_{1-5}$)alkane.

16. An article comprising the composition of claim 1.

* * * * *